(No Model.) 2 Sheets—Sheet 2.
F. H. RICHARDS.
WEIGHING APPARATUS.
No. 561,522. Patented June 2, 1896.
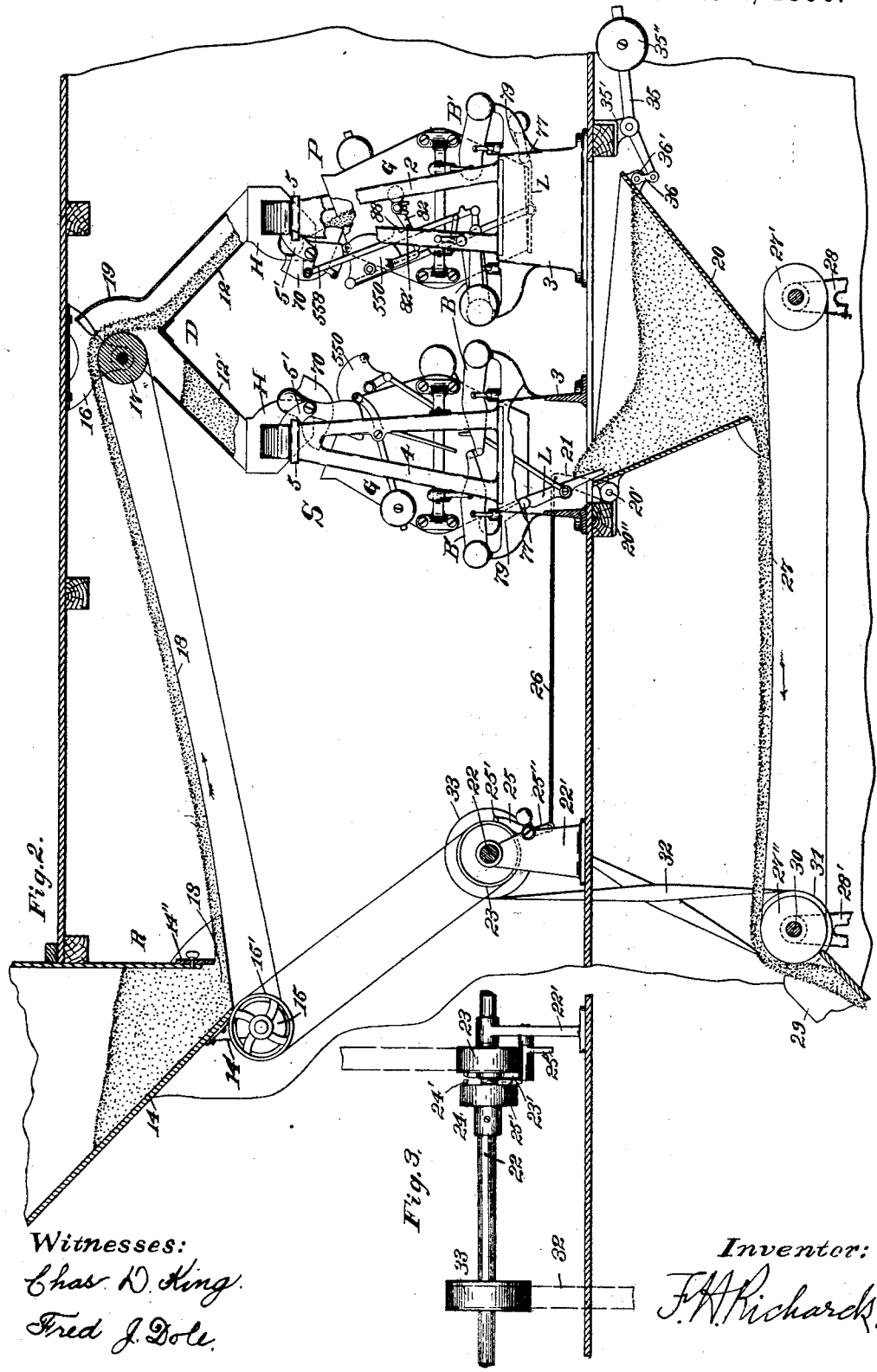
Witnesses:
Chas. D. King.
Fred J. Dole.
Inventor:
F. H. Richards.

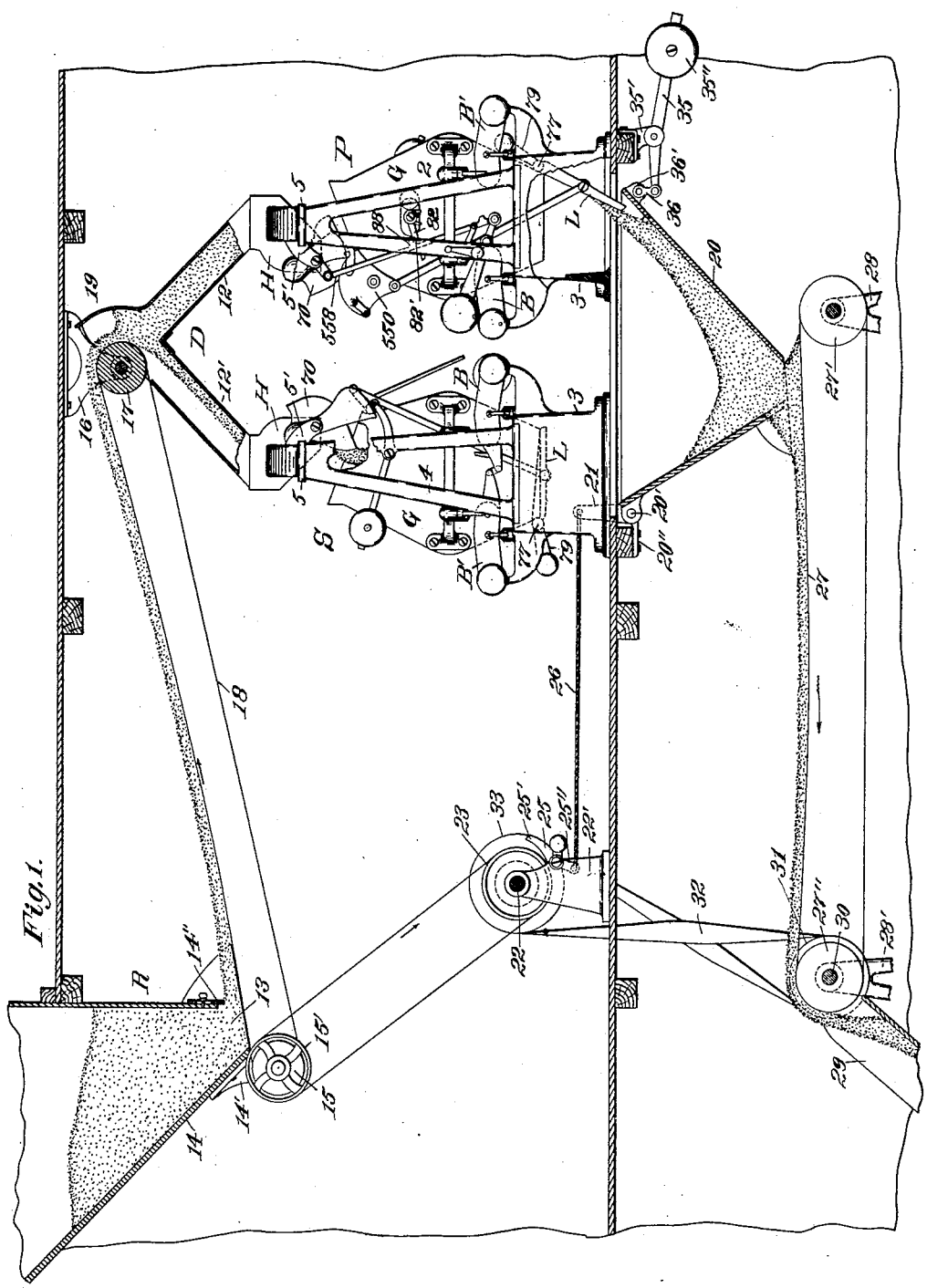

UNITED STATES PATENT OFFICE.

FRANCIS H. RICHARDS, OF HARTFORD, CONNECTICUT.

WEIGHING APPARATUS.

SPECIFICATION forming part of Letters Patent No. 561,522, dated June 2, 1896.

Application filed January 23, 1896. Serial No. 576,508. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatuses, of which the following is a specification.

This invention relates to weighing apparatuses, the object being to provide an improved organization of coacting mechanisms and devices embodying, as a part thereof, a pair of weighing machines or mechanisms, and a supply device for supplying to such machines at a constant and uniform rate the material to be weighed, the component mechanisms and devices of the apparatus being so disposed relatively to each other that when the supply of material is diverted from one of said weighing-machines it will be directed to the other weighing-machine, and be thereby disposed of without clogging or blocking up the supply device.

In the drawings accompanying and forming part of this specification, Figure 1 is a diagrammatic view, in end elevation, of the apparatus, showing feeding mechanism embodying a feeder for supplying the mass to be weighed in the form of a stream into one or the other of the pair of weighing-machines, and discharge-conveying mechanism for conveying away the mass discharged by one or both of said machines, one of the latter being illustrated as discharging its bucket-load and the other machine as making up its bucket-load. Fig. 2 is a similar view showing the other machine as having discharged its bucket-load and the feeder which feeds the stream of material into the two machines in its inactive position; and Fig. 3 is a detail view, in front elevation, of a portion of the feeder-movement-limiting means.

Similar characters of reference designate like parts in all the figures of the drawings.

My present improvements embody a pair of weighing-machines and a supply device therefor, consisting of a pair of communicating conduits or branches.

For the purpose of illustrating the nature and operation of my improved weighing apparatus I have shown, embodying as a part thereof, a pair of weighing-machines, each of which is similar in all material respects to the improved weighing-machines disclosed and claimed in Letters Patent No. 548,840, granted to me October 29, 1895, to which reference may be had. For convenience these weighing-machines will be termed a "primary" weighing-machine and a "secondary" weighing-machine, and are designated, respectively, by P and S.

In describing the operative mechanisms and devices of the two weighing-machines the same characters of reference will be employed to designate corresponding parts thereof, and only those mechanisms and devices of such machines will be described as are necessary to clearly illustrate the purpose of my present improvements.

It is obvious, and I wish it to be understood, that the invention is not limited to the employment of any particular type of weighing machine or mechanism, as other types of machines may be substituted for those illustrated.

The two weighing-machines P and S being the same it is deemed necessary to describe the operative mechanisms of but one of said machines—for example, the primary weighing-machine P.

The framework for carrying the operative parts of the weighing-machine may be of any suitable construction, and it is shown comprising two side frames or uprights 2 and 4, mounted upon a chambered supporting-base 3 and connected by a top plate 5, to which a suitable hopper—such as H—is shown secured by some suitable means.

The base 3 carries suitable beam-supports for supporting the beam mechanism, which latter is shown consisting of a pair of oppositely-disposed counterweighted scale-beams B and B'.

The beam mechanism carries at proper points thereon suitable bucket-supports for supporting the bucket, which latter is illustrated at G, and is of the well-known "single-chambered" type or class. The bucket G will be so disposed as to receive the mass of material in the form of a supply-stream from the hopper H.

The bucket-closer, which is designated in a general way by L, is shown pivoted at 77 to the lower side of the bucket and adjacent to one side of the discharge-opening thereof and having a counterweighted arm 79 preferably formed integral therewith for returning the closer to its closed position.

As a means for supporting the bucket-closer L an inverted toggle connection is shown connecting the closer and the bucket. In the form shown this toggle connection comprises the rocker 550, pivoted adjacent to the upper rearward side of the bucket, and a long connecting-rod pivoted to said rocker and also to the closer in such a manner that when the closer is shut the two pivots of said connecting-rod or toggle member will be nearly in line with and the upper of said pivots will be above the rocker-pivot.

A bucket-closer latch is shown at 82 pivoted to the bucket G in such a manner as to engage the rocker 550 when the parts are in the closed position previously described. In the embodiment shown the closer-latch 82 swings upwardly to engage the rocker 550, and it will be apparent that said latch is released from engagement therewith by a downward movement.

As a means for releasing the latch 82 it is shown provided with a stop-arm 82', which is in position to be engaged by a suitable actuator or releaser device for depressing the said latch. When the latch 82 is thus depressed and disengaged from the rocker 550, the bucket-closer L will be free of all restraint, so that the mass of material resting on the bucket-closer may force the same open for discharging the bucket-load.

As a means for controlling the supply-stream which flows into the weighing-machine a valve is shown a t70, which is substantially similar to the improved valve disclosed and claimed in Letters Patent No. 535,727, granted to me March 12, 1895, to which reference may be had. The valve 70 is shown pivoted for oscillatory movement within arms or brackets 5', depending from the top plate of the machine.

As a means for actuating the valve to open and close the same any suitable valve-actuating mechanism may be employed—for example, the mechanisms illustrated and described in Letters Patent first hereinbefore mentioned.

It will be remembered that the closer-latch 82 has been described as released from engagement with the rocker 550 to thereby also release the bucket-closer L by a downward pressure or movement, and, as a means for effecting this operation, a valve-operated actuator will be preferably employed.

The valve 70 is illustrated carrying at the rear thereof a relatively long connecting-rod 558, which has formed thereon at a suitable point the actuator 88, which, on the closure of the valve, will have a descending movement.

At the proper point in the operation of the machine the actuator 88 will be thrust downwardly into engagement with the stop-pin 82', carried by the latch 82, and succeeding the cut-off of the supply-stream said latch 82 will be depressed, this action freeing the bucket-closer L in the manner previously described.

Weighing-machines of the ordinary type, and of the type disclosed in prior Letters Patent granted to me, are constructed and operate to receive the material to be weighed in a relatively large stream running into the bucket of the weighing-machine for a limited period, the bucket-load being completed by a much smaller stream or what is termed the "drip-stream," which runs into the bucket for a relatively longer period of time. The result of this method of operating the weighing-machine in practice is to require a reservoir of material above the machine for receiving the stream of material during the drip-stream period and for supplying the requisite large amount of material for the major part of the load, which is delivered into the bucket by the relatively large stream just alluded to. In some cases, however, it is impracticable to provide a sufficiently large reservoir for furnishing the supply required for operating the machine to its normal capacity, and also impracticable to supply a stream of material to the weighing-machine of constantly-varying volume. To obviate these disadvantages it is therefore one of the aims of my present invention to provide a weighing apparatus embodying two or more independently-operating weighing machines or mechanisms located relatively to each other and to the supply mechanism which supplies said machines with material, so as to receive said material at a constant and uniform rate, the apparatus being so organized that the supply, when diverted from one weighing-machine, will be directed to the other weighing-machine and be disposed of without appreciable loss of time and without clogging up the supply mechanism or requiring a large-sized reservoir for containing the material to be weighed.

A supply device or chute is shown at D, consisting of two communicating conduits or branches, which also communicate with each of the two weighing-machines P and S, said conduits being designated, respectively, by 12 and 12'.

The conduits 12 and 12' will be preferably angularly disposed, their angle of disposition being in excess of the angle of repose of material being weighed, so as to freely permit the descent and flow of the mass of material, which constitutes the supply-stream, into each of the buckets of the two machines. The supply device or chute D will be carried in some suitable manner. For example, it may, as shown, be supported by the hoppers H of the two machines P and S, said hoppers, as shown, practically forming a continuation of the two conduits or branches 12 and 12' of the supply device D. I prefer to have the conduits 12 and 12' closed for the purpose of preventing the escape of the material or supply, as this passes from one machine to the other through the communicating conduits 12 and 12'.

The secondary weighing-machine S constitutes what may be termed an "overflow-machine."

The valves 70 of the two machines P and S control the supply-streams flowing from the hoppers of their respective machines, and hence from the conduits or branches 12 and 12' of the supply device or chute D. The material to be weighed will be supplied to the supply device or chute D by a suitable power-driven feeder or other means, and at the point where the conduits 12 and 12' communicate.

A suitably-supported bin or reservoir is shown at R, of relatively large capacity, and having a discharge orifice or opening 13. This bin is adapted for receiving and containing the material to be weighed, and may be supplied in any suitable manner.

The front wall 14 of the bin R is shown inclined and also carrying a bracket or hanger 14', which latter is duplicated, and in which, as illustrated, is journaled the shaft of the roll 15, which latter constitutes one of the feeder-supporting mediums.

A suitably-supported bracket is shown at 16, which will also be duplicated, which brackets are adapted to receive and support the shaft of a roll 17, which constitutes the other feeder-supporting medium.

The two rolls 15 and 17 are shown operatively connected by means of the endless belt or apron 18, which constitutes a feeder for feeding a stream of material from the bin R into either of the two machines.

The feeder 18, as stated, is in the form of an endless belt or apron and is of suitable material and width and operatively connects the two rolls 15 and 17, the former of which constitutes the power-roll, being operatively connected with some suitable driving mechanism for actuating the same and thereby the feeder. The feeder 18 is so disposed as to receive the mass of material from the bin R, the material gravitating thereon and being fed thereby into the weighing-machines, the direction of movement of said feeder being indicated by the arrow in Fig. 1. The feeder 18 is preferably inclined in an upward direction from the reservoir toward the weighing-machine or the point at which the material is discharged therefrom into the supply device or chute D, so that on the stoppage of the feeder, in a manner to be hereinafter described, the material cannot drop or gravitate therefrom into said supply device D. The rear wall of the bin R is shown carrying a vertically-adjustable gate or plate 14'' for regulating the volume of the fed stream from the reservoir or bin R.

The mass of material supplied by the feeder 18 will be fed into the supply device D, from which it may be directed into either of the two weighing-machines. At the commencement of operation the conduit 12, which is illustrated as being approximately in vertical alinement with the descending stream of material fed thereinto by the feeder 18, and the valve 70, which controls the flow of the stream, being at this point in the operation of the apparatus in its open position, the full stream from the conduit 12 will flow into the primary weighing-machine P. At the commencement of the poising period the supply-stream will have been materially reduced, it being at this point in the operation in the form of a drip or reduced stream. As the drip-stream flows into the primary weighing-machine P the flow of the material into said machine becomes checked, due to the closing of the valve 70, so that it accumulates in the branch 12 of the supply device D, this accumulation continuing during the drip period and increasing on the cut-off of the supply-stream from the primary machine P, so that when the mass has completely filled the branch 12 it will flow therefrom and be directed into the communicating branch 12', and from thence into the bucket of the secondary weighing-machine S, the valve thereof being in its open position.

It will be understood that each weighing-machine is operable independently of the other, and as soon as each receives its bucket-load the latter will be discharged therefrom in the usual manner.

As a means for preventing overflow or escape of the material when it is diverted from one machine to the other, the supply device or chute D is illustrated carrying an overflow-guard consisting of the upwardly-projecting plate 19, carried thereby, which acts as an effectual bar to the escape of the material as the mass is diverted from one to the other of the two machines.

It occasionally happens during the operation of the apparatus that both machines discharge their bucket-loads simultaneously, or nearly so, and such contingency arising it is imperative that the supply of material to the supply device D should be so modified that choking up of the supply device by the constantly-accumulating mass and consequential escape of the material will be prevented, and my present invention contemplates also the provision of means for limiting the movement of the feeder to thereby also correspondingly limit or check the supply of material to the weighing-machines.

A discharge-hopper is shown at 20, supported for reciprocal movement adjacent to and beneath the two machines, and into which the bucket-loads of each of said machines may be discharged, and means operable with said hopper are employed for controlling the movement of the feeder.

The discharge-hopper, which is also shown counterbalanced, is so disposed relatively to the two machines as to be depressed from its normal position, as indicated in Fig. 1, by the mass discharged by said weighing-machines, and means preferably operatively connected with the discharge-hopper 20 are employed for throwing the feeder 18 out of action to stop the feed-stream when the said hopper has reached and passed a predetermined point, and for also returning the feeder to action or motion for again feeding the supply-stream to the weighing-machine when said hopper has resumed its normal position. The discharge-hopper 20 is shown pivotally supported at 20' by suitable brackets, one of which is shown at 20" and as having operative therewith the upwardly-projecting arm or member 21, the function of which will be hereinafter described.

As a means for imparting movement to the feeder 18 some suitable driving or actuating mechanism will be employed, and a power-shaft is shown at 22, constituting a part of such driving or actuating mechanism, said shaft being operatively connected with a motor. (Not shown.) One of a pair of standards for supporting the power-shaft 22 is shown at 22'. The shaft 22 is illustrated loosely carrying the pulley or band wheel 23, which is operatively connected by a belt with a coöperating pulley 15', carried by the shaft of the feeder-supporting roll 15, and by which the said roll 15, and hence the feeder 18, may be driven.

A clutch operatively connected with and constituting a part of the driving mechanism and operable by the discharge-hopper is provided, so that on the movement of the latter said clutch may be clutched or unclutched for either starting or stopping the feeder 18. The pulley 23, which is illustrated loosely carried by the shaft 22, is shown provided with a pivotally-supported member 23', which normally presses outwardly, a spring (not shown) being provided for effecting the result. This spring-pressed member 23' is so disposed as to normally engage a suitable device or pin, as 24', carried by the coacting clutch member 24, which latter is illustrated fixedly carried by and rotative with the shaft 22, so that when the pin 24' and spring-pressed member 23' are in engagement the pulley 23, and hence the feeder 18, will be thereby driven.

As a means for disengaging the clutch members an actuator, operatively connected with the discharge-hopper 20, is illustrated. Such an actuator is shown at 25 in the form of a counterweighted lever pivotally supported by the standard 22', the counterweight thereof maintaining the actuator 25 in its normal position or out of engagement with the spring-pressed member 23' of the clutch. This actuator 25 has operative therewith the wedge-shaped member 25', which is adapted to engage the spring-pressed member 23' of the clutch and force the same inwardly or out of engagement with the pin 24', carried by the coöperating clutch member 24, which latter is rotative with the power-shaft 22. The actuator 25 also has operative therewith the portion 25", which is illustrated operatively connected by means of the flexible connector 26 with the upwardly-extending arm 21 of the discharge-hopper 20.

Should the two weighing-machines discharge their bucket-loads simultaneously, or nearly so, into the discharge-hopper 20, the weight of the discharged mass thereof will depress the hopper, this action rocking the arm 21 and moving it, and hence the portion 25" of the actuator 25, toward the right. As the actuator 25 is thus moved the wedge-shaped member 25' thereof will be oppositely moved and will engage the clutch member 23' and disengage the same from the pin 24' on the coöperating member 24, carried by the shaft 22, thereby stopping the movement of the pulley 23, and hence stopping the feeder 18, as indicated in Fig. 2.

Means are provided for conveying away the mass discharged by the two weighing-machines, and for this purpose I prefer to employ the discharge-conveyer (shown) onto which the mass discharged by the two weighing-machines gravitates from the hopper 20, and this discharge-conveyer preferably has a faster speed or movement than the feeder 18, so that when the feeder 18 is stopped for the purpose described the period of stoppage may be reduced to a minimum, the discharged mass being quickly conveyed away from the weighing-machine.

The discharge-conveyer is shown at 27 in the form of an endless band or belt passed around the supporting-rolls 27' and 27", which latter are illustrated carried by the standards or brackets 28 and 28', the direction of movement of this discharge-conveyer being indicated by the arrow.

A suitably-supported chute is shown at 29, into which the mass conveyed by the conveyer 27 away from the two weighing-machines may be discharged to be delivered into suitable receptacles.

The shaft 30 of the conveyer-supporting roll 27" is illustrated carrying a relatively small pulley 31, which is operatively connected by means of the belt 32 with the relatively larger pulley or band-wheel 33, carried by and rotative with the drive or power shaft 22, said pulley being secured to said shaft in some well-known manner.

The normal position of the discharge-hopper 20 is indicated in Fig. 1, and said hopper, it will be remembered, is depressible from this position by the weight of the mass discharged by one or both machines to the position illustrated in Fig. 2, and as a means for returning said discharge-hopper to its normal position I prefer to employ a counterbalance, which is illustrated as being separate therefrom.

A bracket is shown at 35', pivotally supporting the counterweight or counterbalanced lever 35, the counterbalance of which slightly exceeds or overbalances the total weight of the discharge-hopper and a weight equaling one bucket-load, so that when said discharge-hopper is in its depressed position and the weight of the mass therein having been decreased approximately to one bucket-load said counterbalance will be effective for returning said hopper to its normal position, and during the normal operation of the machine said counterbalance tends to maintain the hopper in its normal position, as indicated in Fig. 1.

The weight 35" will preferably be made adjustable along the rear arm of the lever 35, to thereby better adapt the apparatus to the weighing of materials of different specific gravities, and the forward arm of said lever is illustrated pivotally carrying the connecting-link 36, which is shown also pivotally connected with the lug 36', formed on the discharge-hopper 20.

The operation of the apparatus is as follows: The two weighing-machines, it will be assumed, are in the normal positions thereof—that is, with both buckets empty, the closers L closed, and the valves 70 open. The reservoir or bin R, being supplied with material and the regulating-gate 14 opened and the feeder started, the mass will be fed from the reservoir R by the feeder 18 in the direction of the arrow and will be delivered into the conduit 12, and from thence will descend into the bucket G of the primary weighing-machine. As the bucket of said machine fills it tends to descend, and during the descending movement thereof the valve 70 will be gradually closed, thereby correspondingly reducing the volume of the supply-stream which flows from the conduit 12. At the commencement of the poising or drip-stream period the supply-stream will have been materially reduced, so that the mass begins to accumulate in and gradually fill the conduit 12. The drip-stream then completes the bucket-load of the primary weighing-machine, at which time the valve 70 thereof is closed. On the completion of the bucket-load the actuator 88 will be projected downwardly into engagement with the stop-pin 82', carried by the bucket-closer latch 82, thereby disengaging said latch from the rocker 550 and also releasing the bucket-closer L, at which point the mass of material in the bucket will force the bucket-closer open for discharging the bucket-load of said machine. At the commencement of the drip period the mass slowly accumulates in the conduit 12, and more rapidly when the valve which controls the flow of material from the conduit 12 has completely cut off the supply-stream therefrom. When the mass of onflowing material has completely filled the conduit 12, it is directed toward or flows into the communicating conduit 12', and from thence into the secondary weighing-machine S, the operation of which is similar to that of the primary weighing-machine P. The mass discharged by the buckets of the machine is directed into the counterbalanced hopper 20, and from thence onto the conveyer 27 and delivered into the chute 29.

Should the two machines discharge their bucket-loads simultaneously or should one machine discharge its bucket-load onto a partial bucket-load in the hopper 20, the latter will be depressed by the weight of the discharged mass from its normal position, this action also throwing the feeder out of action, and hence stopping the supply of material to the two machines until the conveyer 27 has carried away the excess of material, when the feeder 18 will again supply the two machines.

Having thus described my invention, I claim—

1. In an apparatus of the class specified, the combination with a pair of independently-operating weighing-machines, of a supply device therefor; a power-driven feeder for supplying a stream of material to said supply device; driving mechanism for said feeder; and automatic means for limiting the action of said feeder.

2. In an apparatus of the class specified, the combination with a weighing-machine, of a power-driven feeder therefor; a receptacle so supported relatively to said weighing-machine as to be depressed from its normal position by the weight of a mass of material discharged thereby; means operated by said receptacle for limiting the action of the feeder; and means for returning said receptacle to the normal position thereof.

3. A discharge-receiving attachment for a machine, said attachment consisting of a movable receptacle; in combination with a power-driven feeder for delivering material to such machine; and means actuated by the receptacle for limiting the movement of the feeder.

4. A pivoted receptacle for receiving material discharged from a machine; in combination with a power-driven feeder for delivering material to such machine; and connecting means intermediate the receptacle and feeder for limiting the movement of such feeder.

5. A movably-mounted receptacle for receiving material discharged from a machine; in combination with a power-driven feeder; connections between said receptacle and feeder for limiting the action of the feeder; and a suitable conveyer for receiving and conveying material discharged from the receptacle.

6. The combination with a pair of weighing-machines, and a power-driven feeder for such machines; of a movable receptacle for receiving material discharged by such machines; a device for limiting the action of the feeder; and means connecting said device with the movable receptacle.

7. The combination with a pair of weighing-machines, of a power-driven feeder for such machines; a pair of communicating conduits; stream-controlling valves; mechanism for actuating said valves; a movable receptacle for receiving material discharged by the weighing-machines; a device for limiting the action of the feeder; and means connecting said device with the receptacle.

8. A discharge-receiving attachment for a machine, said attachment consisting of a movably-mounted receptacle located beneath such machine and displaceable from its normal position by the weight of the discharged material; in combination with a power-driven feeder; a device for limiting the action of the feeder; connections between said device and the receptacle; and means for returning the receptacle to its normal position.

9. In an apparatus of the class specified, the combination with a weighing-machine, of a reservoir; a power-driven feeder; and a chute for receiving material delivered by said feeder; of a movable receptacle located beneath the weighing-machine; a device for limiting the action of the feeder; and means controlled by the movable receptacle for actuating said device.

10. In an apparatus of the class specified, the combination with a pair of weighing-machines; of a supply-chute comprising a pair of communicating conduits; a feeder for delivering material to said chute at the point where the conduits communicate; valves for controlling the flow of material from said conduits; means for actuating said valves; a pivotal receptacle for receiving material discharged by the weighing-machines; a device for limiting the action of the feeder; and means connecting said device with said pivoted receptacle.

11. An apparatus of the class specified, embodying a weighing-machine, a feeder therefor; a reciprocally-supported discharge-hopper; driving mechanism embodying a clutch for driving said feeder; and connections between said clutch and hopper for unclutching the former.

12. An apparatus of the class specified, embodying a weighing-machine, a feeder therefor; a reciprocally-supported discharge-hopper; driving mechanism embodying a clutch for driving said feeder; and a flexible connector between said hopper and clutch.

13. In an apparatus of the class specified, the combination with a pair of weighing-machines, of a supply device therefor comprising a pair of communicating conduits, each of which leads to one of said weighing-machines; a power-driven feeder for feeding a stream of material into said supply device; a valve for each of said conduits; valve-actuating mechanism; a reciprocally-supported receptacle located beneath said weighing-machines and adapted to receive the mass of material discharged thereby; and means for limiting the movement of said feeder.

FRANCIS H. RICHARDS.

Witnesses:
   FRED. J. DOLE,
   HENRY BISSELL.